US011861267B2

(12) United States Patent
Giordano et al.

(10) Patent No.: US 11,861,267 B2
(45) Date of Patent: Jan. 2, 2024

(54) INTERACTIVE DESIGN TOOL FOR REAL-TIME ARCHITECTURAL ADAPTATION

(71) Applicant: HALSEY, MCCORMACK & HELMER, INC., New York, NY (US)

(72) Inventors: Christian Daniel Giordano, Lincroft, NJ (US); Michael Scott Kipfer, Brooklyn, NY (US); Jeffrey Anderson, Brooklyn, NY (US); Ahmad Y Tabbakh, Brooklyn, NY (US)

(73) Assignee: HALSEY, MCCORMACK & HELMER, INC., New York, NY (US)

( * ) Notice: Subject to any disclaimer, the term of this patent is extended or adjusted under 35 U.S.C. 154(b) by 270 days.

(21) Appl. No.: 16/950,716

(22) Filed: Nov. 17, 2020

(65) Prior Publication Data

US 2022/0156417 A1    May 19, 2022

(51) Int. Cl.
*G06F 30/12* (2020.01)
*G06F 30/13* (2020.01)
(Continued)

(52) U.S. Cl.
CPC .............. *G06F 30/12* (2020.01); *G06F 30/13* (2020.01); *G06T 13/40* (2013.01); *G06T 19/006* (2013.01); *G06T 19/20* (2013.01); *G06F 2111/18* (2020.01)

(58) Field of Classification Search
CPC ...... G06F 30/12; G06F 30/13; G06F 2111/18; G06F 3/048; G06F 30/00; G06F 30/17;
(Continued)

(56) References Cited

U.S. PATENT DOCUMENTS 5,515,261 A    5/1996  Bogdan
6,040,661 A    3/2000  Bogdan
(Continued)

FOREIGN PATENT DOCUMENTS

WO    WO-2021092194 A1 *    5/2021    ............. A61B 34/20

OTHER PUBLICATIONS

Farzad Pour Rahimian, Rahinah Ibrahim, Impacts of VR 3D sketching on novice designers' spatial cognition in collaborative conceptual architectural design, Design Studies, vol. 32, Issue 3, 2011, pp. 255-291, ISSN 0142-694X, https://doi.org/10.1016/j.destud.2010.10.003. (Year: 2011).*

*Primary Examiner* — Brian S Cook
(74) *Attorney, Agent, or Firm* — FisherBroyles, LLP; Douglas P. Lalone

(57) ABSTRACT

An interactive design tool may be configured for real-time architectural adaptation. This may include a user device including a hardware processor, physical memory and a user interface. The user device may provide operations to generate a virtual reality (VR) architectural session including a toolbelt with a virtual selection tool for adaptation of at least one of an environment, an object and an avatar. The operations may further include to receive or select a selection spot on the object by a projection between the virtual selection tool and the object, receive or select an adaptation relative to at least one of the object, the environment and the avatar; and display the adaptation to the at least one of the object, the environment and the avatar in real-time during the VR architectural session.

20 Claims, 18 Drawing Sheets

(51) Int. Cl.
*G06T 19/20* (2011.01)
*G06T 19/00* (2011.01)
*G06T 13/40* (2011.01)
*G06F 111/18* (2020.01)

(58) Field of Classification Search
CPC ....... G06F 30/18; G06T 13/40; G06T 19/006; G06T 19/20; G06T 2200/24; G06T 2219/2016
USPC .............................................................. 703/1
See application file for complete search history.

(56) References Cited

U.S. PATENT DOCUMENTS

| | | | |
|---|---|---|---|
| 6,069,457 | A | 5/2000 | Bogdan |
| 6,137,240 | A | 10/2000 | Bogdan |
| 6,608,617 | B2 | 8/2003 | Hoffknecht et al. |
| 9,367,950 | B1 | 6/2016 | Scranton et al. |
| 10,049,493 | B1 | 8/2018 | Verizzo et al. |
| 10,467,814 | B2 | 11/2019 | Loberg et al. |
| 11,086,474 | B2 * | 8/2021 | Lee ....................... H04L 67/131 345/633 |
| 2002/0123812 | A1 | 9/2002 | Jayaram et al. |
| 2009/0209211 | A1 | 8/2009 | Kondo |
| 2012/0268463 | A1 | 10/2012 | Loberg |
| 2013/0262233 | A1 | 10/2013 | Bradley et al. |
| 2015/0351172 | A1 | 12/2015 | Hung et al. |
| 2017/0122545 | A1 | 5/2017 | Chen et al. |

\* cited by examiner

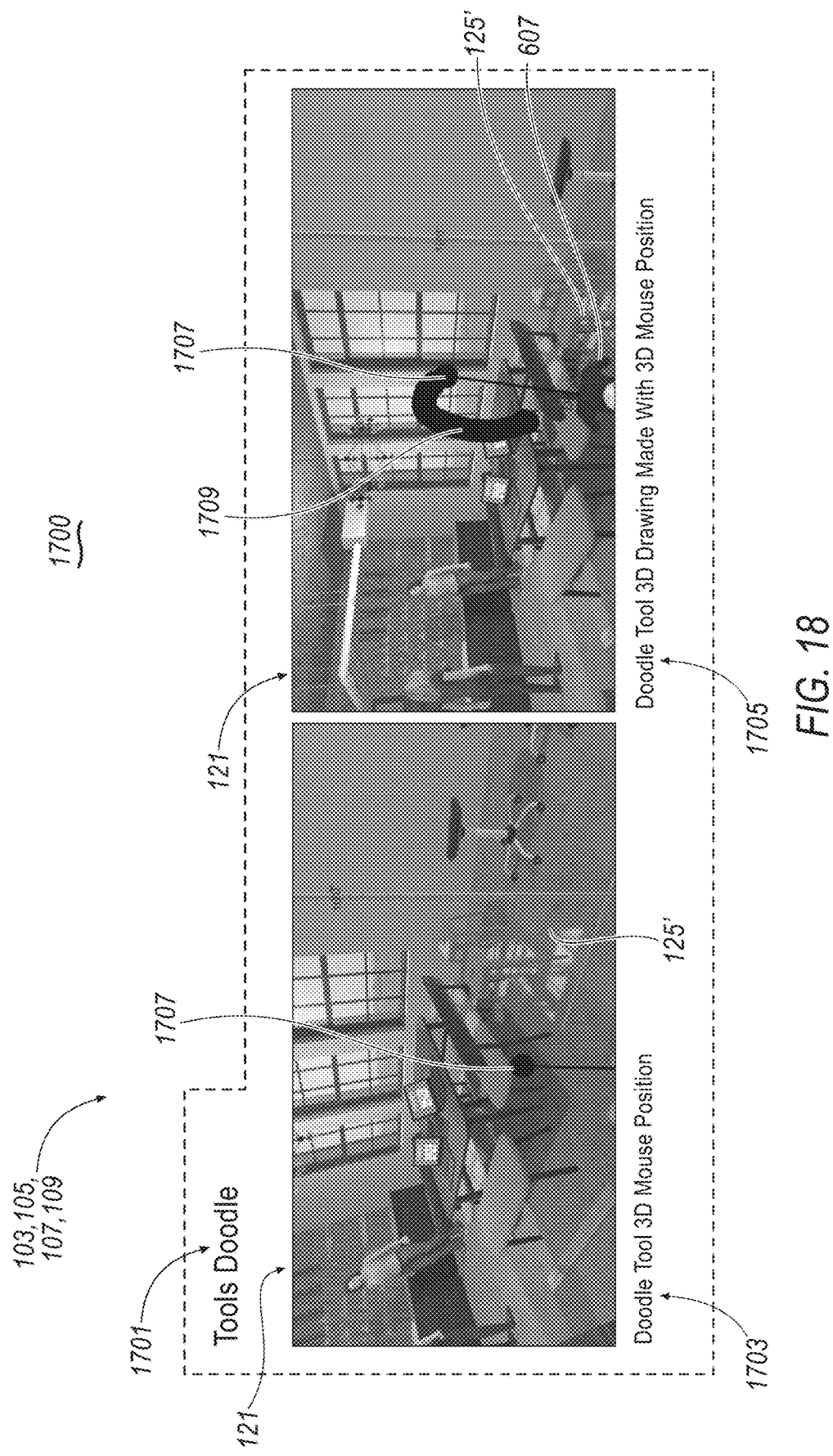

INTERACTIVE DESIGN TOOL FOR REAL-TIME ARCHITECTURAL ADAPTATION

BACKGROUND

Designers such as architects have traditionally planned, designed and constructed buildings using an evolving set of paper drawings. Any change to one portion of the drawing could require significant manual revisions to numerous drawings. Further, any modifications were subject to inconsistent dimensions and loading issues. This process was extremely timing and prone to errors.

More modern platforms may allow designers to create electronic models to reduce redrafting time, but they are still based on a compilation of static elements from different data sources that are prone to similar issues as paper drawings. For example, if a change is requested while the model is in a viewing session with an observer, the designer is typically forced to end the viewing session, make element-by-element modifications that may take days or weeks, recompile the new static elements into a second model, and schedule another session for viewing of the second model. Further, these static elements are merely placed aesthetically relative to each other with no structural interdependence with respect to each other or the environment. A one element change may require a series of manual one-by-one to other elements while introducing inconsistencies. Traditional platforms result in architectural delays and inaccuracies and are ultimately unsuitable for real-time adaptation.

There is a need for systems and methods as disclosed herein that solve the above problems. There is a need for the interactive design tool herein that provides real-time architectural adaptation. This disclosure provides advantages and solutions over prior platforms.

BRIEF DESCRIPTION OF THE DRAWINGS

FIG. 18 illustrates an exemplary tool for doodling new concepts of the present disclosure.

DETAILED DESCRIPTION

Exemplary systems, devices and methods may include an interactive design tool for real-time architectural adaptation. This may include a user device including a hardware processor, physical memory and a user interface. The user device may provide operations to generate a virtual reality (VR) architectural session including a toolbelt with a virtual selection tool for adaptation of at least one of an environment, an object and an avatar.

Operations may include to receive or select a selection spot on the object by a projection between the virtual selection tool and the object, receive or select an adaptation relative to at least one of the object, the environment and the avatar; and display the adaptation to the at least one of the object, the environment and the avatar in real-time during the VR architectural session.

These may further include to receive a second adaptation relative to the at least one of the object, the environment and the avatar, receive a third adaptation relative to the at least one of the object, the environment and the avatar, change one or more portions of the at least one of the object, the environment and the avatar according to one or more of the first, second and third adaptations, move one or more portions of the at least one of the object, the environment and the avatar according to one or more of the first, second and third adaptations, and build one or more new portions of the at least one of the object, the environment and the avatar according to one or more of the first, second and third adaptations.

Figure 1:
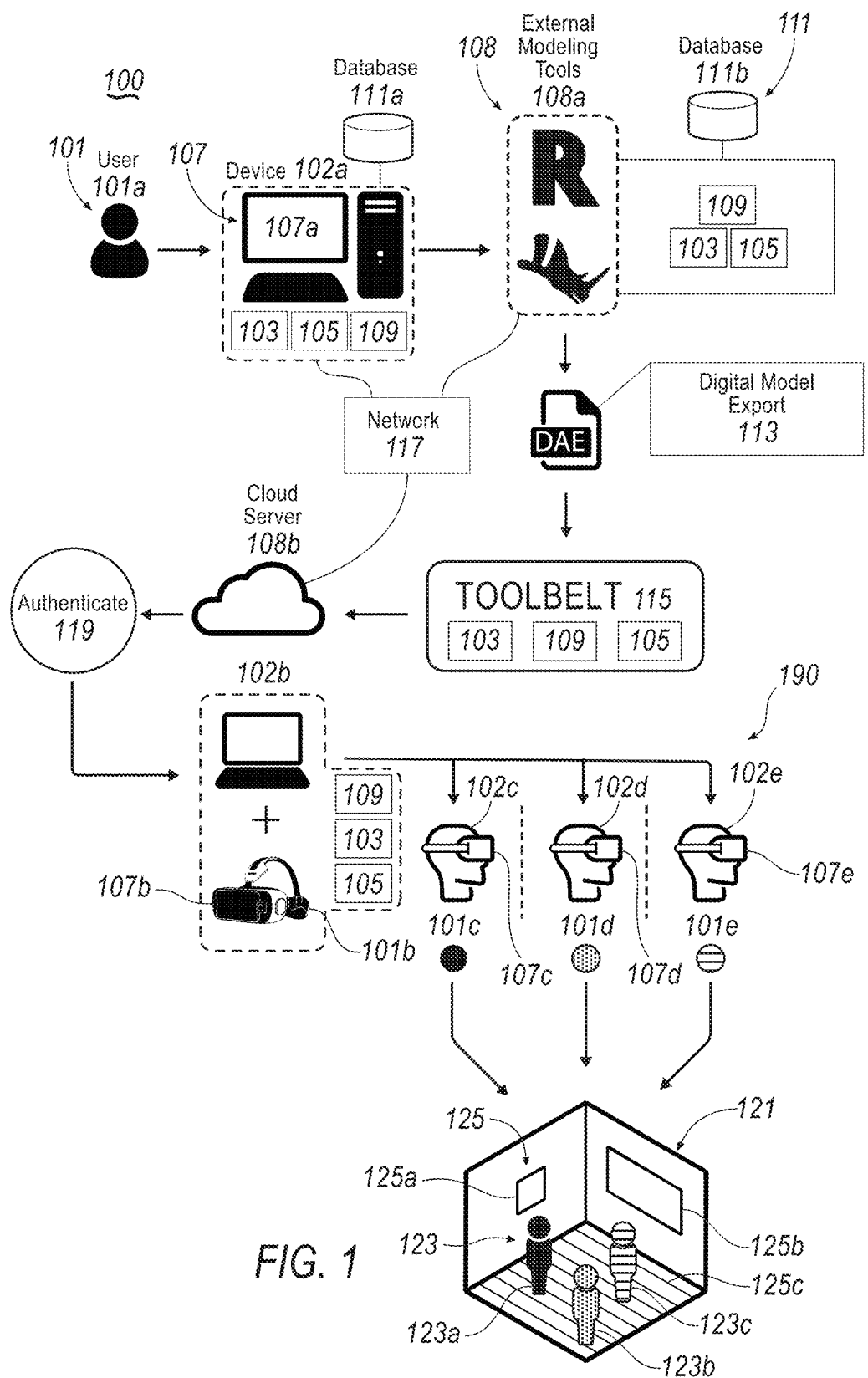
FIG. 1 illustrates an exemplary system of the present disclosure.

FIG. 1 illustrates an exemplary system 100, for example, an interactive design tool including a system for real-time architectural adaptation. System 100 may take many different forms and include multiple and/or alternate components, structures, and arrangements. While an exemplary system 100 is shown, the exemplary components are not intended to be limiting, and additional or alternative components and/or implementations may be used and are contemplated.

FIG. 1 illustrates an exemplary system 100, e.g., a network system for an interactive design tool. System 100 may include user 101 (e.g., admin user 101a and observer users 101b,c,d,e), user device 102 (e.g., devices 102a,b,c,d,e), processor 103 (e.g., hardware processor), memory 105 (e.g., physical memory), user interface 107 (e.g., devices 107a,b, c,d,e), server 108 (e.g., external modeling tools 108a and/or cloud server 108b), program 109, database 111 (e.g., databases 111a,b), export 113 (e.g., digital model export), toolbelt 115, authenticate 119 (e.g., check local license key against license key database and permit use of application if authenticated, environment 121, avatar 123 (e.g., avatars 123a,b,c), and object 125 (e.g., objects 125a,b such as, but not limited to, architectural elements like architectural finishes, architectural geometry (walls, ceilings, floors, and doors) or furnishings like windows, doors, chairs, lighting fixtures, or kitchen equipment, to name a few.

System 100, by way of user interface 107 and program 109 in communication with one or more device 102, processor 103, memory 105, server 108, and/or database 111, may include one or a combination of input-output, display and/or hardware devices such as a mobile, headset, handheld and/or touchscreen device for providing a virtual session (e.g., architectural session) using virtual reality, augmented reality, audiovisual, and/or tactile inputs and outputs. System 100 may adapt, by user interface 107, program 109 and/or processor 102 (should be 103), one or more portions of the operations, user interfaces, and modeling information (e.g., one or more of environment 121, avatar 123, and object 125). System 100 may adapt to include additional plug-ins for other modeling software to facilitate additional connectivity between System 100 and other software.

Figure 2:
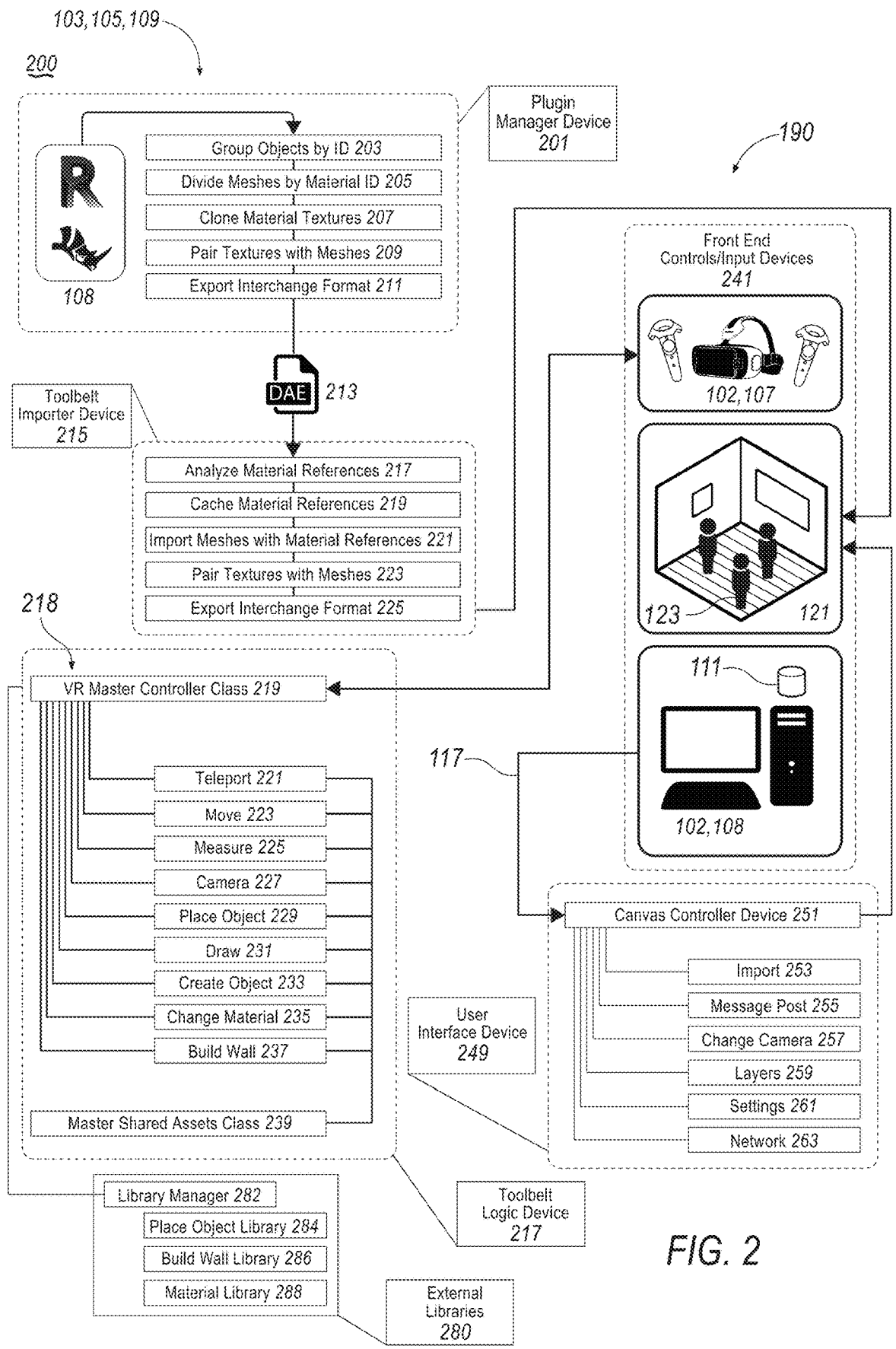
FIG. 2 illustrates an exemplary back-end system of the present disclosure.

FIG. 2 illustrates an exemplary system 200 including, for example, a back-end architecture for providing operations of an interactive design tool 190. System 200 may take many different forms and include multiple and/or alternate components, structures, and arrangements. While an exemplary system is shown, the exemplary components are not intended to be limiting, and additional or alternative components and/or implementations may be used. System 200 may include program 109 configured to provide operations of an interactive design tool 190. System 200 may include program 109 stored on memory 105 to provide the operations, user interfaces and modeling information by way of execution by processor 103, display by user interface 107, transfer by network 117, and/or adaptation by any systems or components herein.

System 200 may include plugin manager device 201, toolbelt importer device 215, toolbelt logic device 217, front end controls/input device 241, a user interface device 249, canvas controller master class device 251, and external libraries 280. Plugin device manager 201 may receive and perform operations on modeling information of server 108. Plugin device manager 201 may perform operations including, but not limited to, group objects 203 (e.g., by identifiers), divide meshes 205 (e.g., divide meshes by material identifiers including object id, material id, object type, or material type, clone textures 207 (e.g., clone material textures by finding their source location in the object's metadata and duplicating the textures to a user-specified file-save location, pair 209 (e.g., pair textures with meshes by binding geometry properties to effect and material properties via the mesh's unique object id and the material's unique material id, and export format 211 (e.g., an interchange file format for interactive and/or 3D applications). Plugin device manager 201 may transfer modeling information by way of exporter 213. Rather than export each polymesh individually, the mesh exporter 213 batches polymesh's by their object id, making the process more efficient and allowing for objects to be moved and otherwise transformed more easily in the system 200.

Toolbelt importer device 215 may receive and perform operations on modeling information that are received from exporter 213. Tool belt importer device 215 may provide operations including, but not limited to, analyze material references 217, cache material references 219, import meshes 221 (e.g., with material references and other related properties stored in the meshes metadata), pair 223 (e.g., textures with meshes), and export 225 (e.g., in an interchange file format). Toolbelt importer device 215 may transfer adapted modeling information with front end controls, or other input devices 241. Devices 201 and 215 are operable to collect object properties such as, but not limited to, name, address, manufacturer, price, dimensions and other parameters of an object.

Toolbelt logic device 217 may exchange modeling information 218 with front end controls/input 241. Toolbelt logic device 217 may provide operations including to exchange modeling information 218 between virtual reality master controller class 219 and master shared asset class 239. Toolbelt logic device 217 may provide operations on modeling information 218 including to teleport 221 (e.g., moves the user avatar through the environment), move 223 (e.g., moves objects around the user using user inputs), measure 225 (e.g., adds measurements and annotations as a 3D line to geometry), camera 227 (e.g., takes a screenshot of the user's view for later documentation), place object 229 (e.g., adds new geometry from a library of objects), draw 231 (e.g., adds 3D lines in a freeform style), create object 223 (e.g., creates new geometry in a freeform style), change material 235 (e.g., changes the object's finish material from a library of materials), and build or modify wall 237 (e.g., adds a wall geometry from a library of walls). Toolbelt logic device 217 may exchange adapted modeling information 218 with front end controls/input 241.

Front end controls 241 may exchange inputs and outputs to adapt modeling information 218. Front end controls 241 may be in communication with and/or include user device 102, user interface 107, server 108, database 111, environment 121, or a combination thereof. Front end controls 241 may exchange information with toolbelt logic device 217 and user interface device 249.

User interface device 249 may include canvas controller 251 (e.g., canvas controller master class) and provide operations including, but not limited to, import 253, message post 255, change camera 257, layers 259 (e.g., allowing users to turn on or off objects by category, for example turn off all floors, or all furniture, or isolate mechanical geometry, etc.), settings 261 (e.g., allows users to change visual appearance such as bloom, lighting intensity, sun position, saturation, and contrast), and network 263 (e.g., controls how to join an online multi-player session or host a new session for others to join).

The external libraries 280 include a library manager 282 for sorting, sourcing, storing, and making available data and other information that a user may desire to access to aid them in the design process. Examples of the information that is available in the library manager 282 includes, but is not limited to, place object library 284, build all library 286 and material library 288. It will be appreciated that the system 200 may have other libraries.

The system 200 also permits multiple users to interact with the same computer using various output screens. If the computer 102 is connected to a VR headset 107b (107 user interface), a user may engage with the avatar 123a, environment 121, or object 125 through the VR Master Controller Class 219 user interface 249 while simultaneously another user 101c, 101d and/or 101e may interact with the avatar 123, environment 121, or object 125 through the Canvas Controller Device 251 user interface via a keyboard 102b, mouse, and standard monitor. In other iterations this may also involve multiple users 101c, 101d, 101e with remotely connected devices such as an AR headset or other. Thus, the present system 200 is operable to provide more than one user to simultaneously interact with other users to collaborate in a design session.

Figure 3:
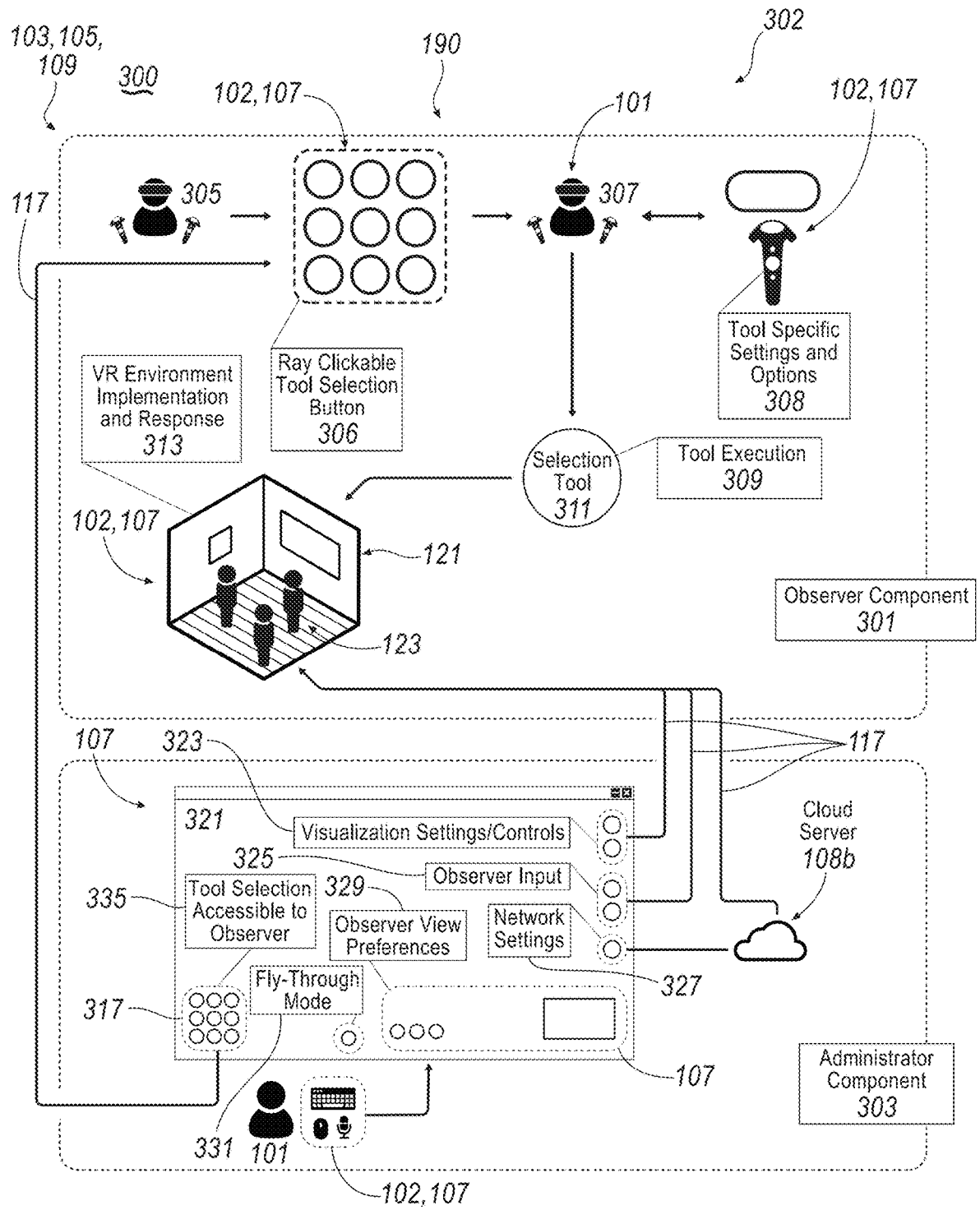
FIG. 3 illustrates an exemplary front-end system of the present disclosure.

FIG. 3 illustrates an exemplary system 300 including, for example, a front-end architecture 302 for providing operations of an interactive design tool 190. System 300 may take many different forms and include multiple and/or alternate components, structures, and arrangements. While an exemplary system 300 is shown, the exemplary components are not intended to be limiting, and additional or alternative components and/or implementations may be used. System 300 may include program 109 configured to provide operations of an interactive design tool 190. System 300 may include program 109 stored on memory 105 to provide the operations, user interfaces and modeling information by way of execution by processor 103, display by user interface 107, transfer by network 117, and/or adaptation by any systems or components herein.

System 300 may include observer component 301 and administrator component 303 to generate one or more sessions of environment 121 by way of one or more processor 103, memory 105, user interface 107 and environment 121. Observer component 301 may include inputs, outputs, buttons and/or selections such as, but not limited to, a first observer user input 305 (e.g., which is operable to permit the user to click a "selection button," "menu buttons," "undo buttons," or "scroll buttons" to engage with virtual content around them), ray clickable tool selection 306 (e.g., a three dimensional user interface comprised of buttons hovering around the VR User in a toolbelt-like orientation, following their avatar 123 position), a second observer user input 307 (e.g., which may be operable to allow another observer provide inputs to engage the virtual content around them), and a tool specific settings and options 308 (e.g., when the material tool is selected, the material library editor appears on the controller wand in the user's hand. When the place object tool 229 is selected, the place object library 284 editor appears in the user's hand. Also, different "help" flags appear on the controllers depending on the tool selected. For example, when the tape measure tool is selected, a "tool tip" appears on the controller that says "click once to begin a measurement, click again to save the measurement"), tool execution 309, selection tool 311, and environment implementation and response 313 (e.g., environment 121). In this iteration we show a VR headset and controllers with specific button mappings, however the invention described here could include any future iterations of VR and AR hardware implementing clickable tool selection with physical controller buttons that can be used to implement our ray clickable tool selection. Administrator component 303 may include inputs, outputs, buttons and/or selections such as administrator inputs 321 (e.g., camera modes, camera settings, import tools, other menu-based controls of the visual, network or import environment, visualization settings/controls 323, observer inputs 325 (e.g., tools for importing new geometries and saving or loading notes drawn by the users. These notes serve as 'meeting minutes' for any changes that a user wants to make or notes they want to leave a client or other architect). The administrator inputs 321 may also include 3D input buttons 317, network settings 327, observer view preferences 329 (e.g., fly-through mode, VR mode, third person VR mode (where the camera is behind the VR users avatar), or shoulder VR mode (where camera is located right behind the VR user's head), a fly-through mode 331 (e.g., which allows users that don't have a VR headset to move through the space using the WASD keyboard inputs, mouse inputs, or arrow keyboard inputs), and a tool selection 335 that is accessible to an observer 101. The administrator inputs 321 may also include "override" commands for the virtual reality user in which the "administrator" can change the observer's tool with a 2D button in case they are lost. Thus, the system 300 is operable to provide a virtual reality tool override. The administrator component 303 further may include user interfaces 107, and server 108 (e.g., cloud server 108b). This system 300 is designed to work through any combination of the following user groups: administrator only, observer only, or administrator and observer working together.

Figure 4:
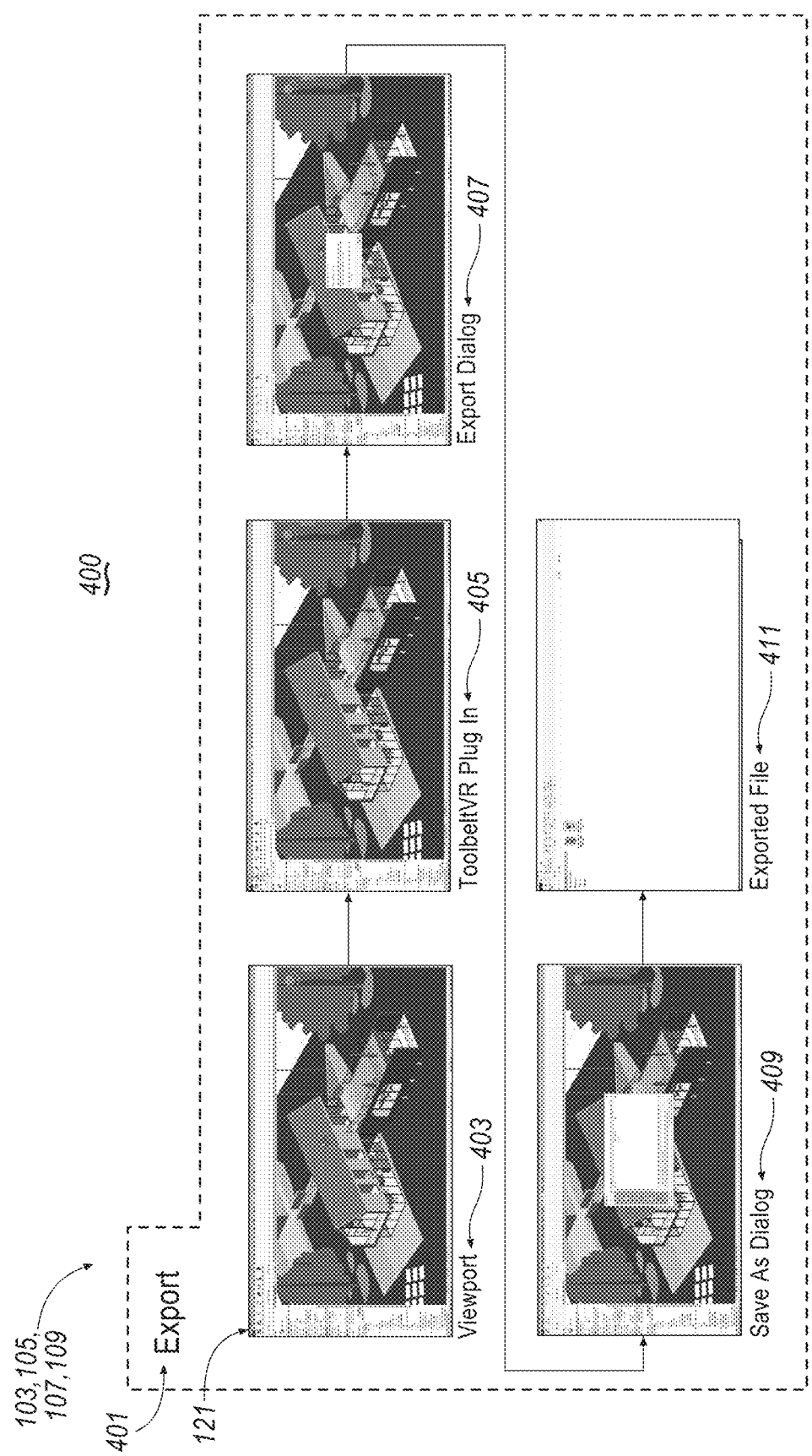
FIG. 4 illustrates an exemplary export process of the present disclosure.

FIG. 4 illustrates an exemplary process 400 of program 109 including, for example, export 401 with operations provided by way of one or more processor 103, memory 105, user interface 107 and environment 121. This process may take many different forms and include multiple and/or alternate steps, components, and arrangements. While an exemplary process is shown, the exemplary steps are not intended to be limiting, and additional or alternative steps, components and/or implementations may be used. For example, processor 103 may execute program 109 to generate one or a plurality of operations, user interfaces and modeling information for display by way of user interface 107 including, but not limited to, viewport 403, toolbelt VR plug-in 405, export dialog 407, save as dialog 409, exported file 411, or a combination thereof. These may include toolbelt 115 to provide user inputs, outputs and corresponding operations for real-time feedback, movement, adaptation, measurement, viewing and image capture of object 125, avatar 123 and/or environment 121. The export process 401 automatically packages all image textures used on materials in the architectural model and places them in a folder that correlates to the exported geometry file's name. This is automatically parsed through during the import process in order to reconstruct every material and properly match it to the geometry it is attached to within our software.

Figure 5:
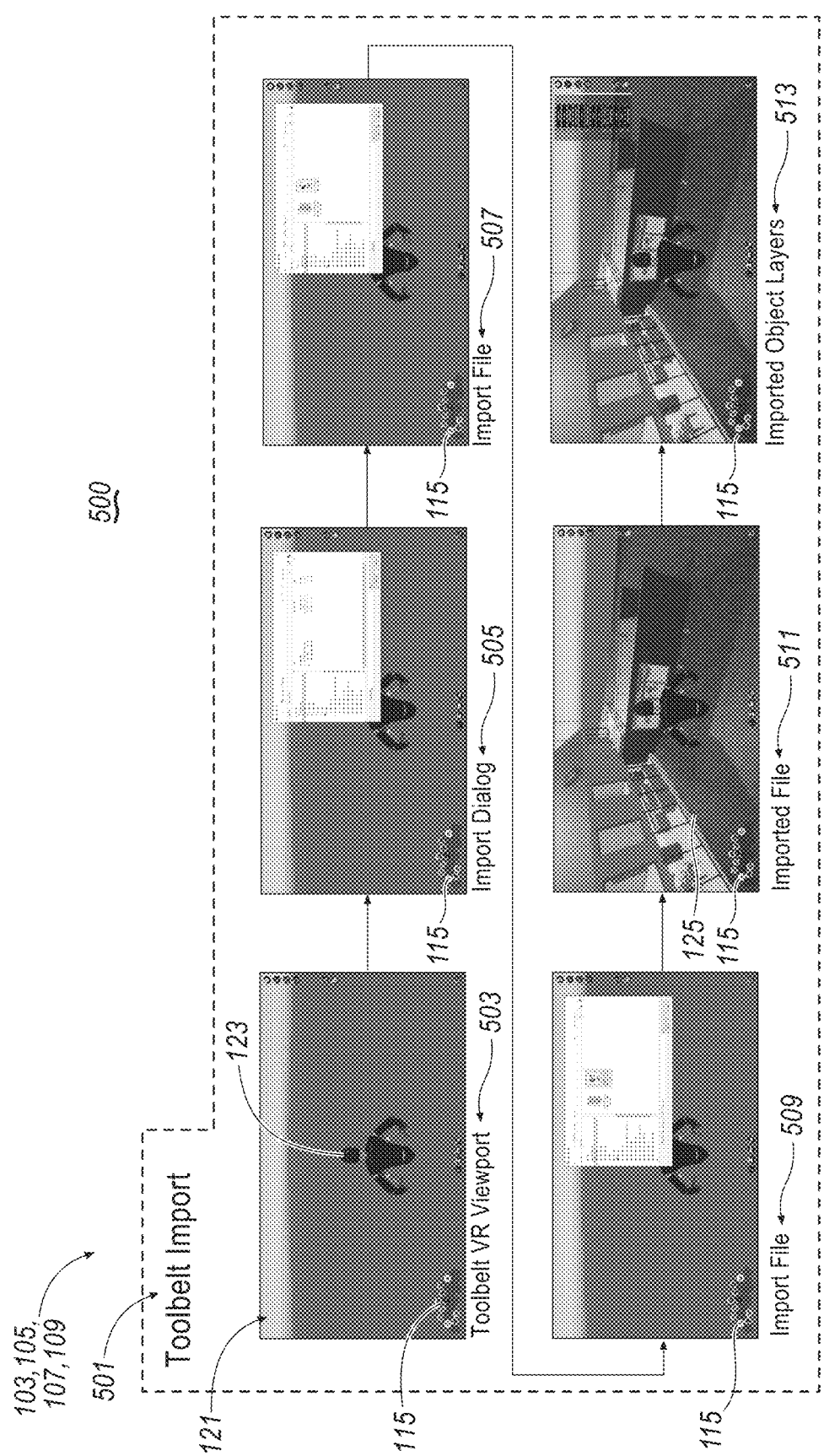
FIG. 5 illustrates an exemplary import process of the present disclosure.

FIG. 5 illustrates an exemplary process 500 of program 109 including, for example, toolbelt VR import 501 with operations provided by way of one or more processor 103, memory 105, user interface 107 and environment 121. Process 500 may take many different forms and include multiple and/or alternate steps, components, and arrangements. While an exemplary process is shown, the exemplary steps are not intended to be limiting, and additional or alternative steps, components and/or implementations may be used. For example, processor 103 may execute program 109 to generate one or a plurality of operations, user interfaces and modeling information for display by way of user interface 107 including, but not limited to, toolbelt VR viewport 503, import dialog 505, import file 507, import file 509, import file 511, import object layers 513, or a combination thereof. These may include toolbelt 115 to provide user inputs, outputs and corresponding operations for real-time feedback, movement, adaptation, measurement, viewing and image capture of object 125, avatar 123 and/or environment 121. Besides the manual import button, an introductory user prompt may be displayed on startup asking the user if they would like to begin their project by importing a file.

Figure 6:
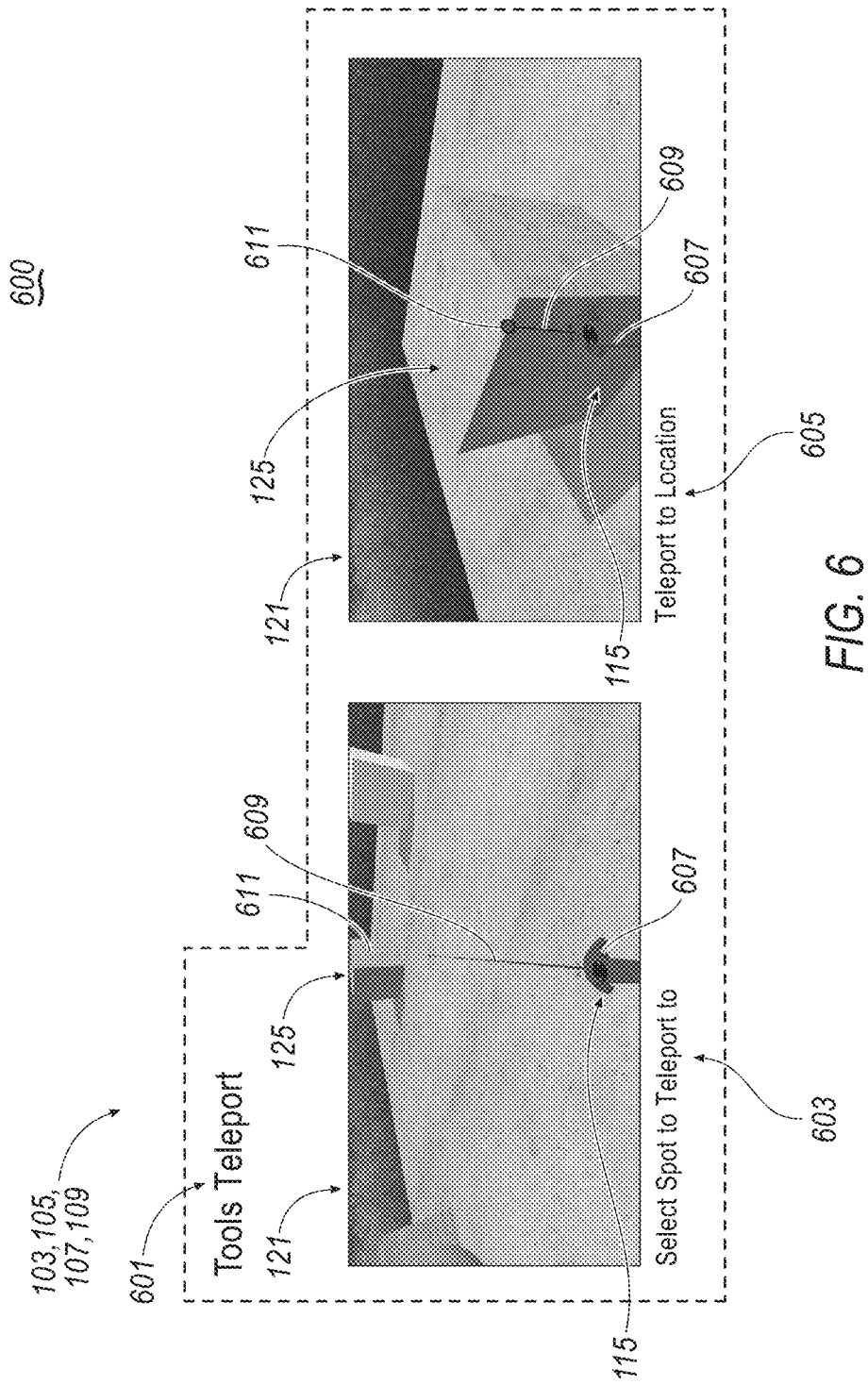
FIG. 6 illustrates an exemplary teleport process of the present disclosure.

FIG. 6 illustrates an exemplary process 600 of program 109 including, for example, VR tools teleport 601 with operations provided by way of one or more processor 103, memory 105, user interface 107 and environment 121. This process may take many different forms and include multiple and/or alternate steps, components, and arrangements. While an exemplary process is shown, the exemplary steps are not intended to be limiting, and additional or alternative steps, components and/or implementations may be used. For example, processor 103 may execute VR tools teleport 601 to generate one or a plurality of operations, user interfaces and modeling information for display by way of user interface 107 including select object 603 (e.g., select object to teleport), select location 605 (e.g., destination for object), or a combination thereof. These may include toolbelt 115 with a virtual selection tool 607 for providing projection 609 onto a selection spot 611 to provide user inputs, outputs and corresponding operations for real-time feedback, movement, adaptation, measurement, viewing and image capture of object 125, avatar 123 and/or environment 121. Teleport "regions" may be locked and unlocked to control where users go. For example, if objects "types" are tagged as "floor" or "stair" the teleport function is turned on when the user points at them. If the user tries to teleport into a wall, they will not be able to do so. The process 600 controls the user experience and restricts them from having an unrealistic or uncomfortable experience in the VR headset.

Figure 7:
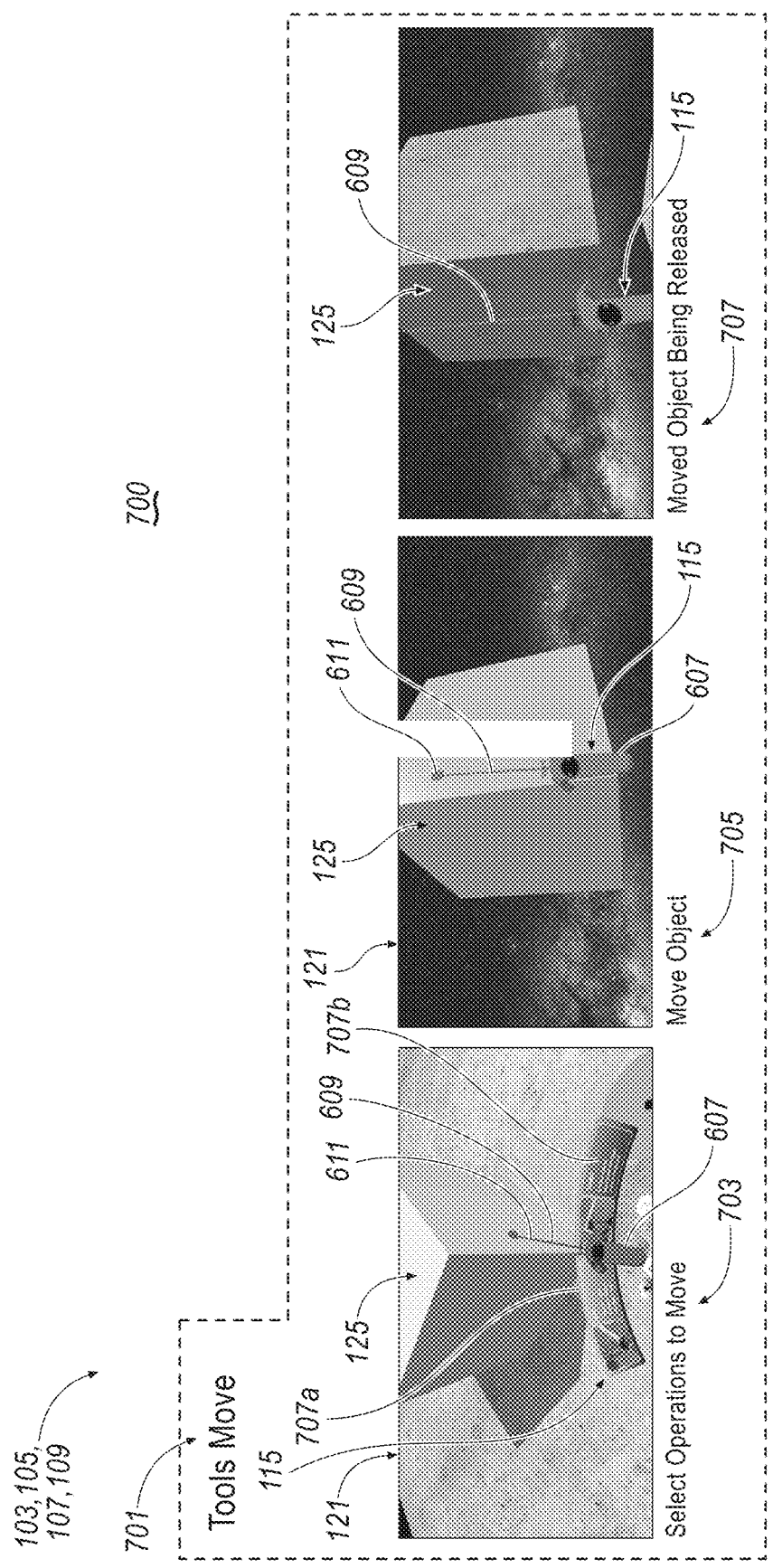
FIG. 7 illustrates an exemplary move process of the present disclosure.

FIG. 7 illustrates an exemplary process 700 of program 109 including, for example, VR tools move 701 with operations provided by way of one or more processor 103, memory 105, user interface 107 and environment 121. This process may take many different forms and include multiple and/or alternate steps, components, and arrangements. While an exemplary process is shown, the exemplary steps are not intended to be limiting, and additional or alternative steps, components and/or implementations may be used. For example, processor 103 may execute program 109 to generate a plurality of operations, user interfaces and modeling information for display by way of user interface 107 including select move operations 703, move object 705, or a combination thereof. These may include toolbelt 115 with first and second virtual-in-virtual (VIV) user interfaces 707a,b for controlling virtual selection tool 607, projection 609 and selection spot 611 to provide user inputs, outputs and corresponding operations for real-time feedback, movement, adaptation, measurement, viewing and image capture of object 125, avatar 123 and/or environment 121. Additionally, moving an object 125 will register its previous position to an "undo" index. If control+z on the keyboard or the "undo buttons" on the controller are clicked, the object 125 will move back to its last position. This list of previous positions is additive, so the user could move an object 125 ten times and hit undo ten times to return it sequentially back to its previous positions until it returns to its original position.

Figure 8:
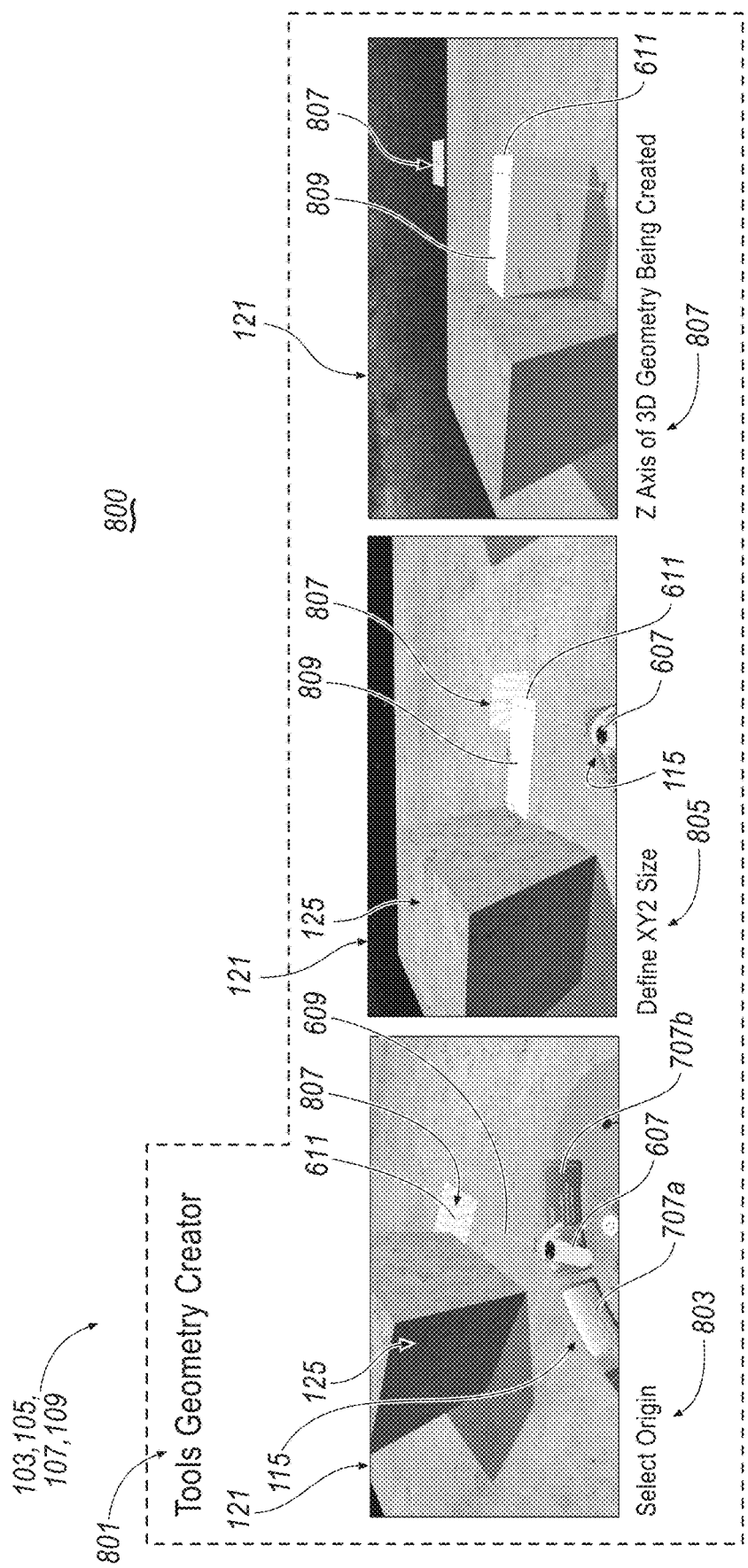
FIG. 8 illustrates an exemplary geometry creator process of the present disclosure.

FIG. 8 illustrates an exemplary process 800 of program 109 including, for example, VR tools geometry creator 801 with operations provided by way of one or more processor 103, memory 105, user interface 107 and environment 121. This process may take many different forms and include multiple and/or alternate steps, components, and arrangements. While an exemplary process is shown, the exemplary steps are not intended to be limiting, and additional or alternative steps, components and/or implementations may be used. For example, processor 103 may execute program 109 to generate one or a plurality of operations, user interfaces and modeling information for display by way of user interface 107 including select origin 803, define x, y and z-axis sizes/dimensions 805, or a combination thereof. These may include toolbelt 115 with first and second VIV user interfaces 707a,b for controlling virtual selection tool 607, projection 609 and selection spot 611 for moving, changing, adapting and resizing a first footprint origin area 807 to a second footprint destination area 809 to provide user inputs, outputs and corresponding operations for real-time feedback, movement, adaptation, measurement, viewing and image capture of object 125, avatar 123 and/or environment 121. If a user mistake occurs during the creation of a new geometry, the operation can be cancelled by pressing the undo button. If an invalid geometry is created, such as one with a height, width, or length dimension of zero, the geometry creation operation is cancelled. If a geometry is properly created, the geometry is added to the "undo" register, as described above for the move tool.

Figure 9:
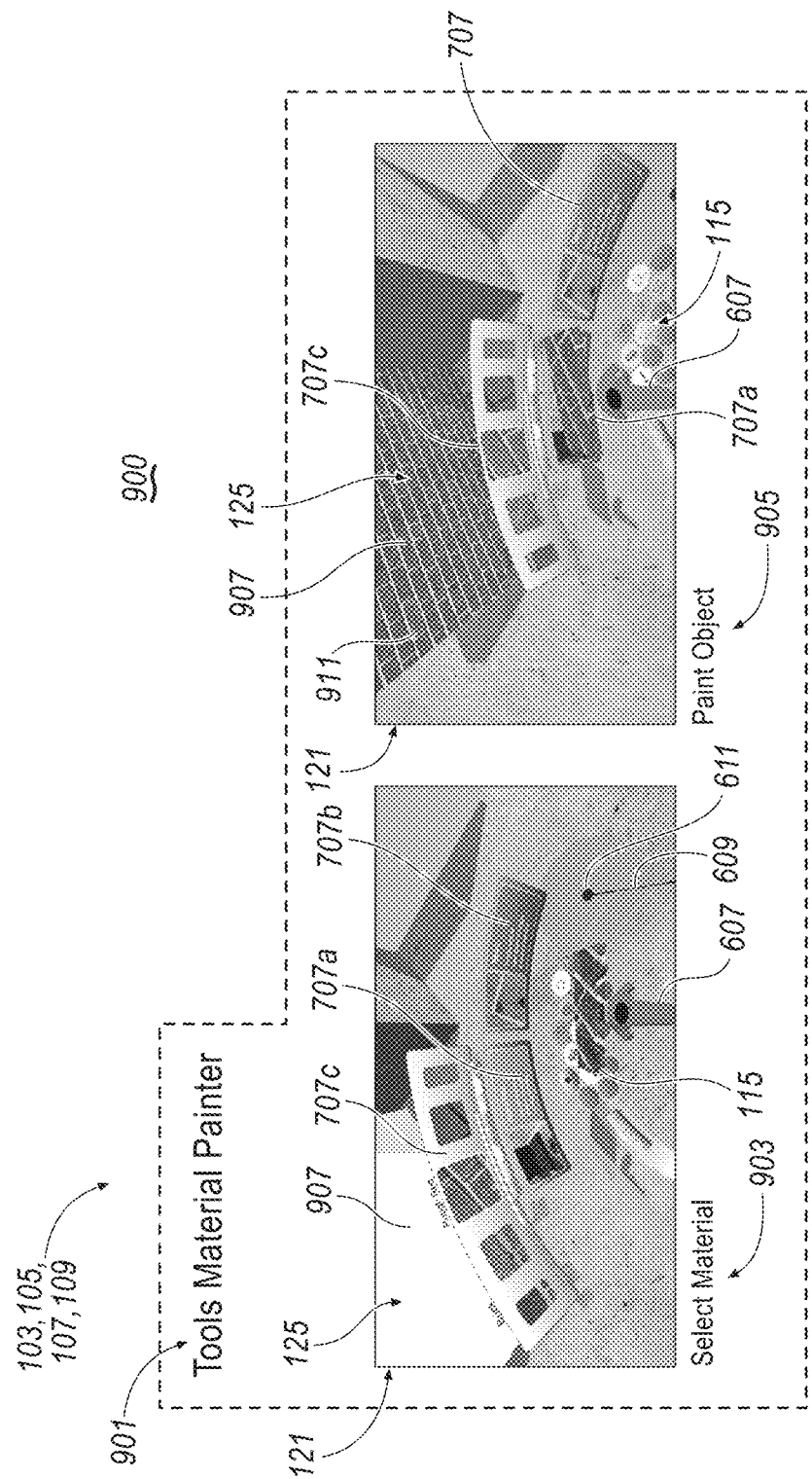
FIG. 9 illustrates an exemplary material painter process of the present disclosure.

FIG. 9 illustrates an exemplary process 900 of program 109 including, for example, VR tools material painter 901 with operations provided by way of one or more processor 103, memory 105, user interface 107 and environment 121. This process may take many different forms and include multiple and/or alternate steps, components, and arrangements. While an exemplary process 900 is shown, the exemplary steps are not intended to be limiting, and additional or alternative steps, components and/or implementations may be used. For example, processor 103 may execute program 109 to generate one or a plurality of operations, user interfaces and modeling information for display by way of user interface 107 including, but not limited to, select material 903, object paint 905, or a combination thereof. These may include toolbelt 115 with first, second and third VIV user interfaces 707a,b,c for controlling object paint 907 by way of virtual selection tool 607, projection 609 and selection spot 611 for moving, changing, adapting and resizing a first object paint area 907 to a second object paint area 911 to provide user inputs, outputs and corresponding operations for real-time feedback, movement, adaptation, measurement, viewing and image capture of object 125, avatar 123 and/or environment 121. A library 288 of materials which is tied to architectural finishes may be provided in the cloud 108b, however users may also create their own materials by uploading images and changing properties. The system and process 900 also allows outside vendors to include material packages as plug-ins.

Figure 10:
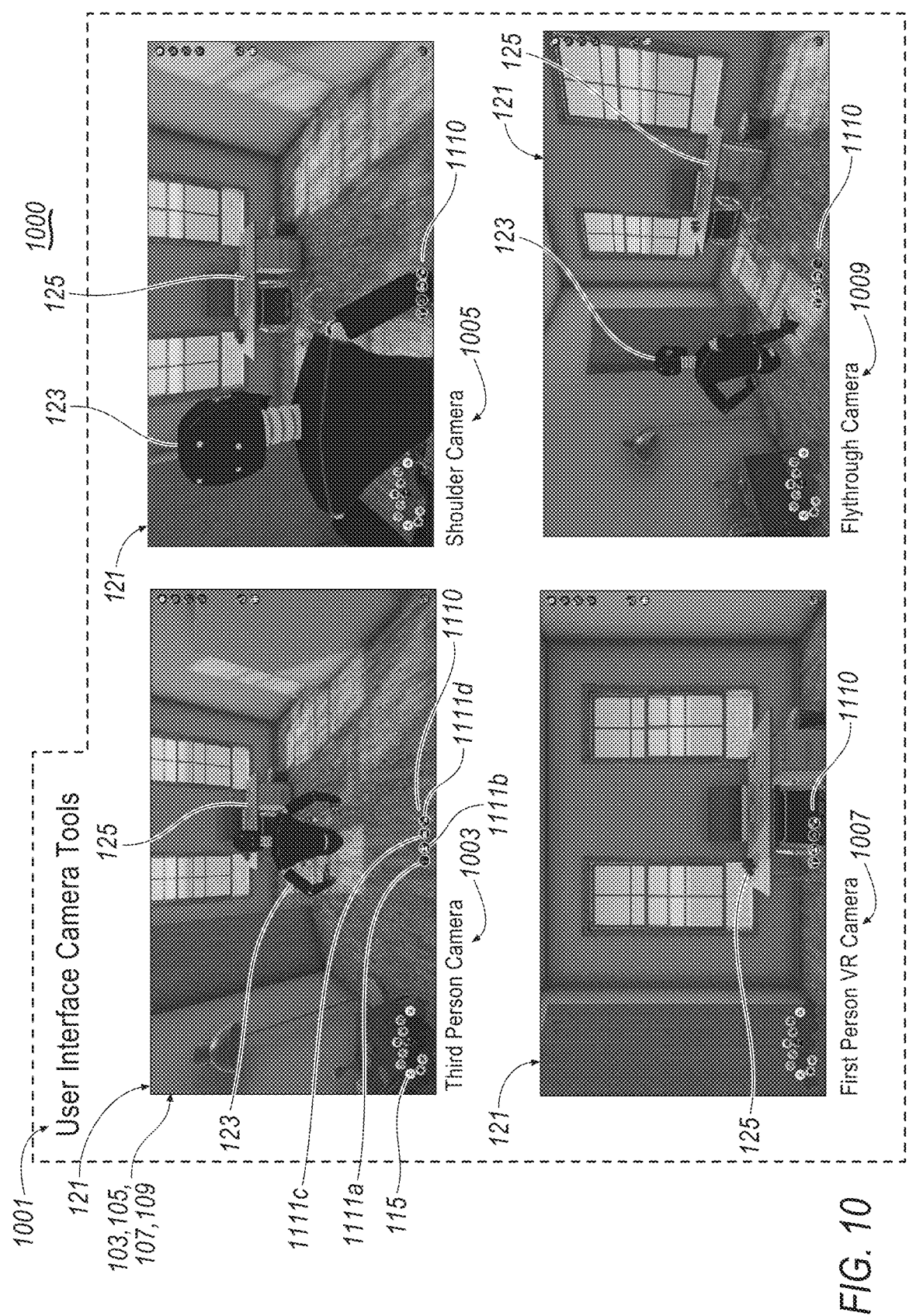
FIG. 10 illustrates an exemplary camera tools process of the present disclosure.

FIG. 10 illustrates an exemplary process 1000 of program 109 including, for example, computer user interface camera tools 1001 with operations provided by way of one or more processor 103, memory 105, user interface 107 and environment 121. This process may take many different forms and include multiple and/or alternate steps, components, and arrangements. While an exemplary process is shown, the exemplary steps are not intended to be limiting, and additional or alternative steps, components and/or implementations may be used. For example, processor 103 may execute program 109 to generate one or a plurality of operations, including but not limited to, user interfaces and modeling information for display by way of user interface 107 including toolbelt 115, third person camera 1003, shoulder camera 105, first person VR camera 1007, fly-through camera 1009, or a combination thereof. These may include environment 121, avatar 123, object 125, and adaptation menu 1110 including corresponding first, second, third and fourth view selections 1111a,b,c,d to provide user inputs, outputs and corresponding operations for real-time feedback, movement, adaptation, measurement, viewing and image capture of object 125, avatar 123 and/or environment 121. The fly-through camera 1009 can be used by an administrator while the vr camera 1007 may be used by an operator. If no VR headset is detected on the user's computer, the fly-through camera 1009 will be the default camera.

Figure 11:
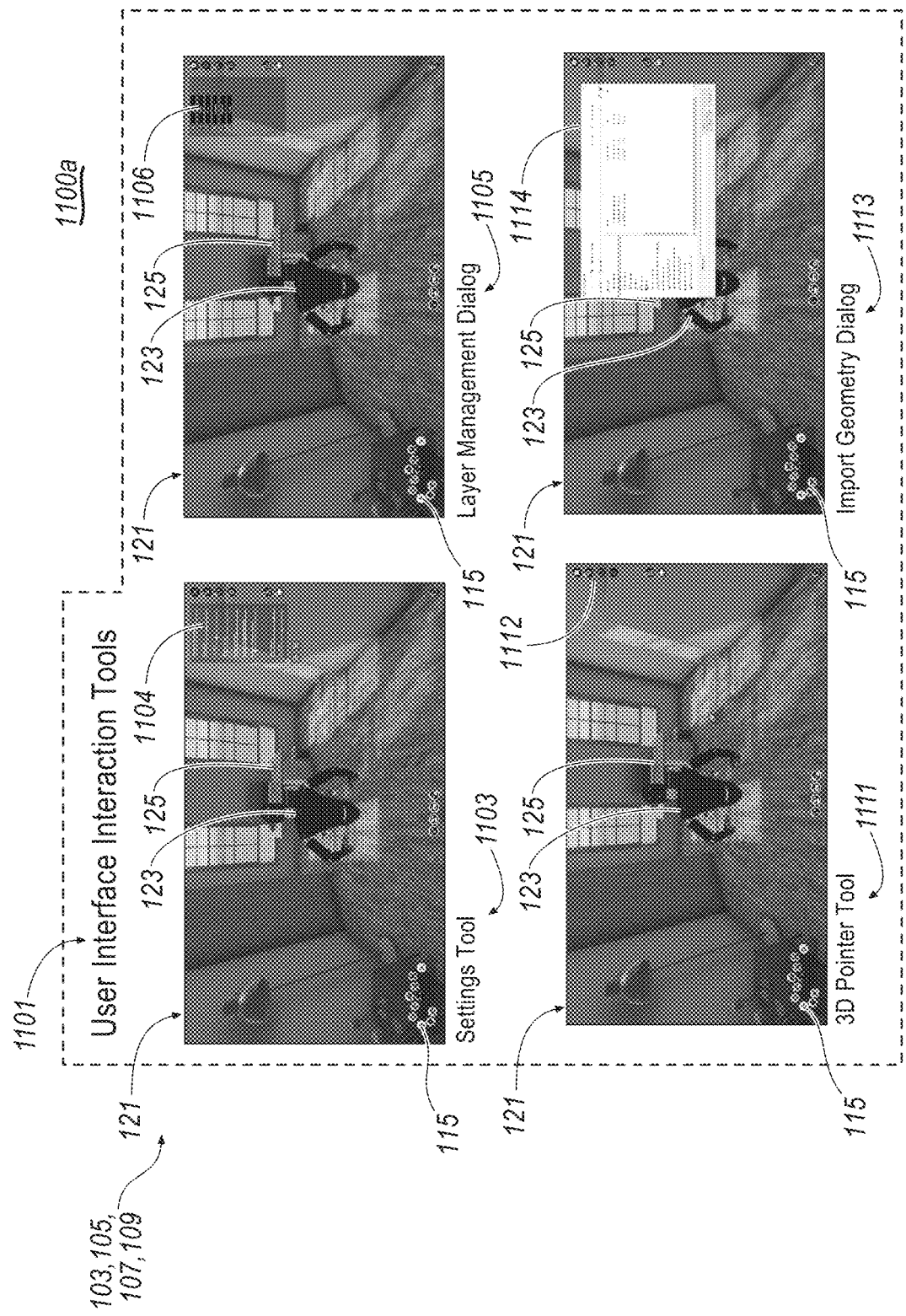
FIG. 11 illustrates an exemplary interaction tools process of the present disclosure.

FIG. 11 illustrates an exemplary process 1100a of program 109 including, for example, computer user interface interaction tools 1101 with operations provided by way of one or more processor 103, memory 105, user interface 107 and environment 121. This process may take many different forms and include multiple and/or alternate steps, components, and arrangements. While an exemplary process is shown, the exemplary steps are not intended to be limiting, and additional or alternative steps, components and/or implementations may be used. For example, processor 103 may execute program 109 to generate one or a plurality of operations, user interfaces and modeling information for display by way of user interface 107 including toolbelt 115, 3D pointer tool 1103, layer management dialog 1105, 3D pointer tool 1111, import geometry dialog 1113 or a combination thereof. Toolbelt 115 may provide associated indictor menus 1104, 1106, 1112, and 1114 to provide user inputs, outputs and corresponding operations for real-time feedback, movement, adaptation, measurement, viewing and image capture of object 125, avatar 123 and/or environment 121. The process 1100*a* is operable to provide a multi-user/multiplayer mode. When in multiplayer mode, the avatar 123 positions and orientations, as well as all avatar tools such as pointer, drawing tool, etc. are shared among all users on the network. Every multiplayer user can see the position, gestures, and tools of all other users. Any changes to geometry, notes, or drawings are also translated in their proper position to every other user.

Figure 12:
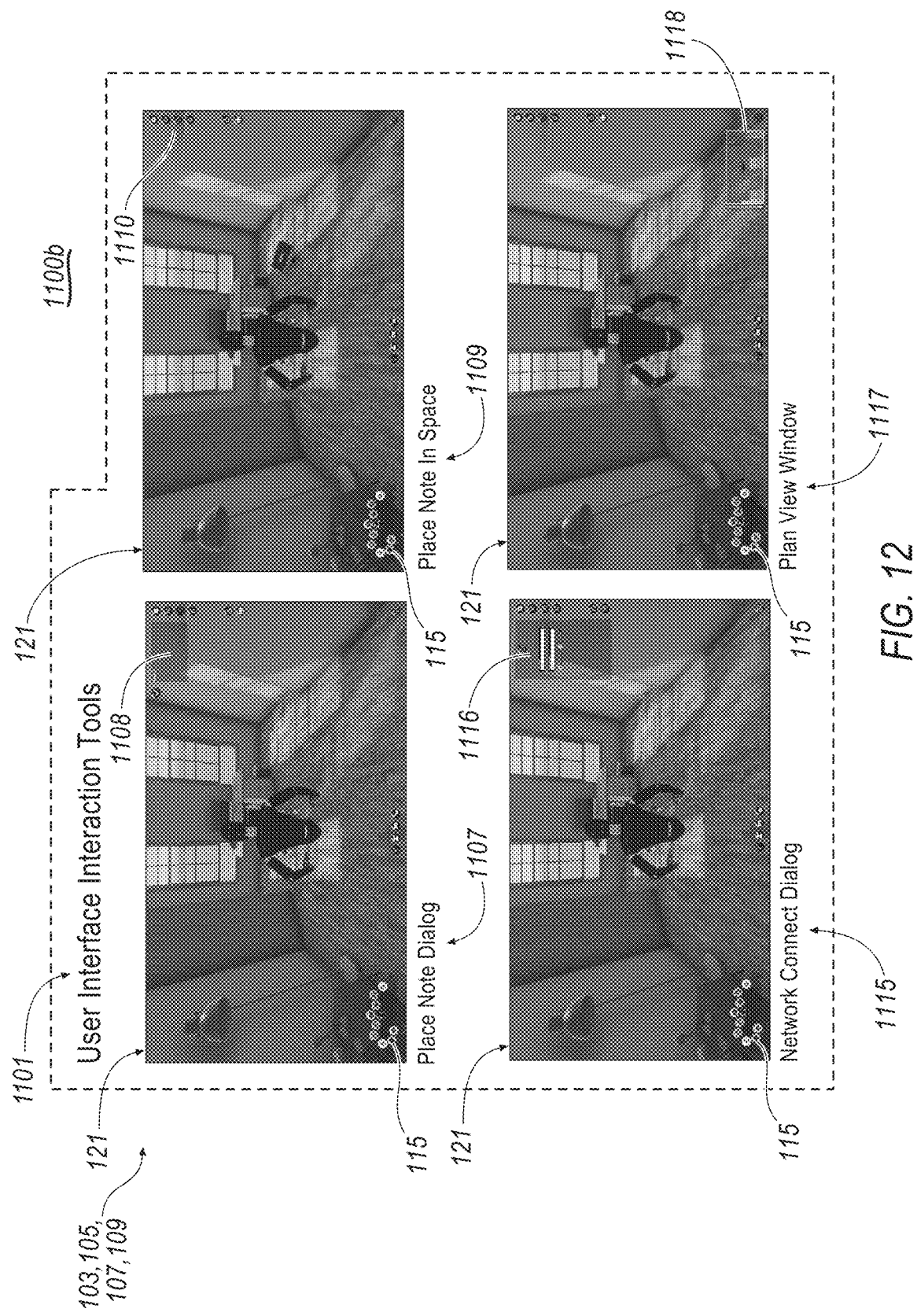
FIG. 12 illustrates an exemplary interaction tools process of the present disclosure.

FIG. 12 illustrates an exemplary process 1100*b* of program 109 including, for example, computer user interface interaction tools 1101 with operations provided by way of one or more processor 103, memory 105, user interface 107 and environment 121. This process may take many different forms and include multiple and/or alternate steps, components, and arrangements. While an exemplary process is shown, the exemplary steps are not intended to be limiting, and additional or alternative steps, components and/or implementations may be used. For example, processor 103 may execute program 109 to generate one or a plurality of operations, user interfaces and modeling information for display by way of user interface 107 including projection 609, selection spot 611, place note dialog 1107, place note in space 1109, network connect dialog 1115, plan view window 1117 or a combination thereof. This may provide associated indictor menus 1108, 1110, 1116, and 1118 to provide user inputs, outputs and corresponding operations for real-time feedback, movement, adaptation, measurement, viewing and image capture of object 125, avatar 123 and/or environment 121. The network button brings up a dialog that allows users to "host" or "join" a network session. Creating a session hosts the users external and internal IP address on a server and facilitates the connection to the host's device from any number of external users. Joining a session connects your computer to the user that hosted an already existing session. If the session name is incorrect or a user is unable to connect, details about the connection problem are displayed to the user. The host is informed of any users that join their session and can see their names in the network dialog and their positions in VR space.

Figure 13:
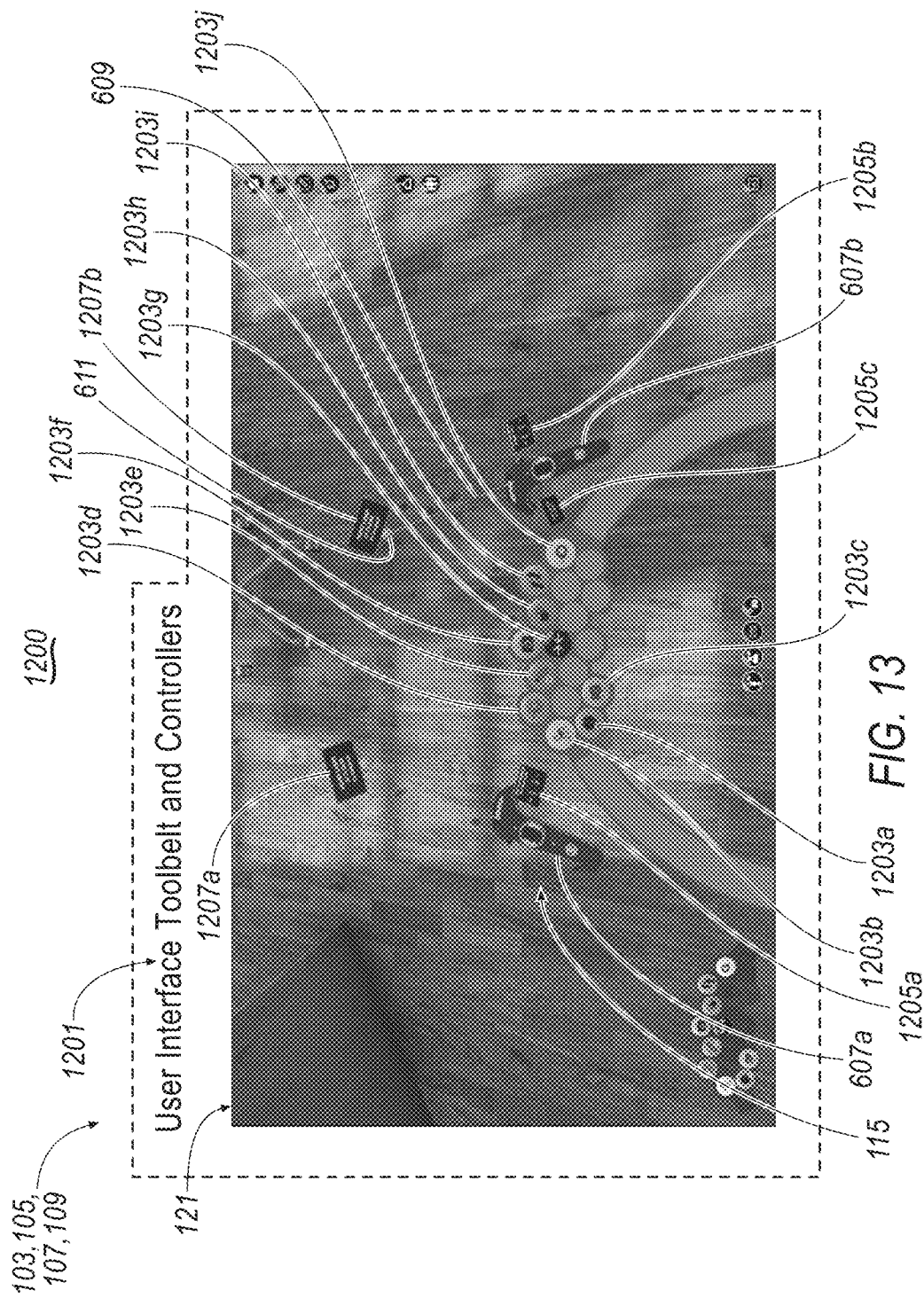
FIG. 13 illustrates an exemplary user interface toolbelt and controllers process of the present disclosure.

FIG. 13 illustrates an exemplary process 1200 of program 109 including, for example, VR user interface toolbelt and controllers 1201 with operations provided by way of one or more processor 103, memory 105, user interface 107 and environment 121. This process is illustrated through a first-person perspective of the VR user looking down at the virtual tools hovering around their waist as three dimensional buttons that are ray clickable through controller input or override commands entered by the administrator at the computer terminal. This process may take many different forms and include multiple and/or alternate steps, components, and arrangements. While an exemplary process is shown, the exemplary steps are not intended to be limiting, and additional or alternative steps, components and/or implementations may be used. For example, processor 103 may execute program 109 to generate one or a plurality of operations, user interfaces and modeling information for display by way of user interface 107 for providing toolbelt 115 with first and second virtual selection tools 607*a,b*, projection 609, selection spot 611, VIV selector orientation viewers 1205*a,b,c*, selector buttons 1203*a-j*, and VIV selection spot viewers 1207*a,b* to provide user inputs, outputs and corresponding operations for real-time feedback, movement, adaptation, measurement, viewing and image capture of object 125, avatar 123 and/or environment 121.

Figure 14:
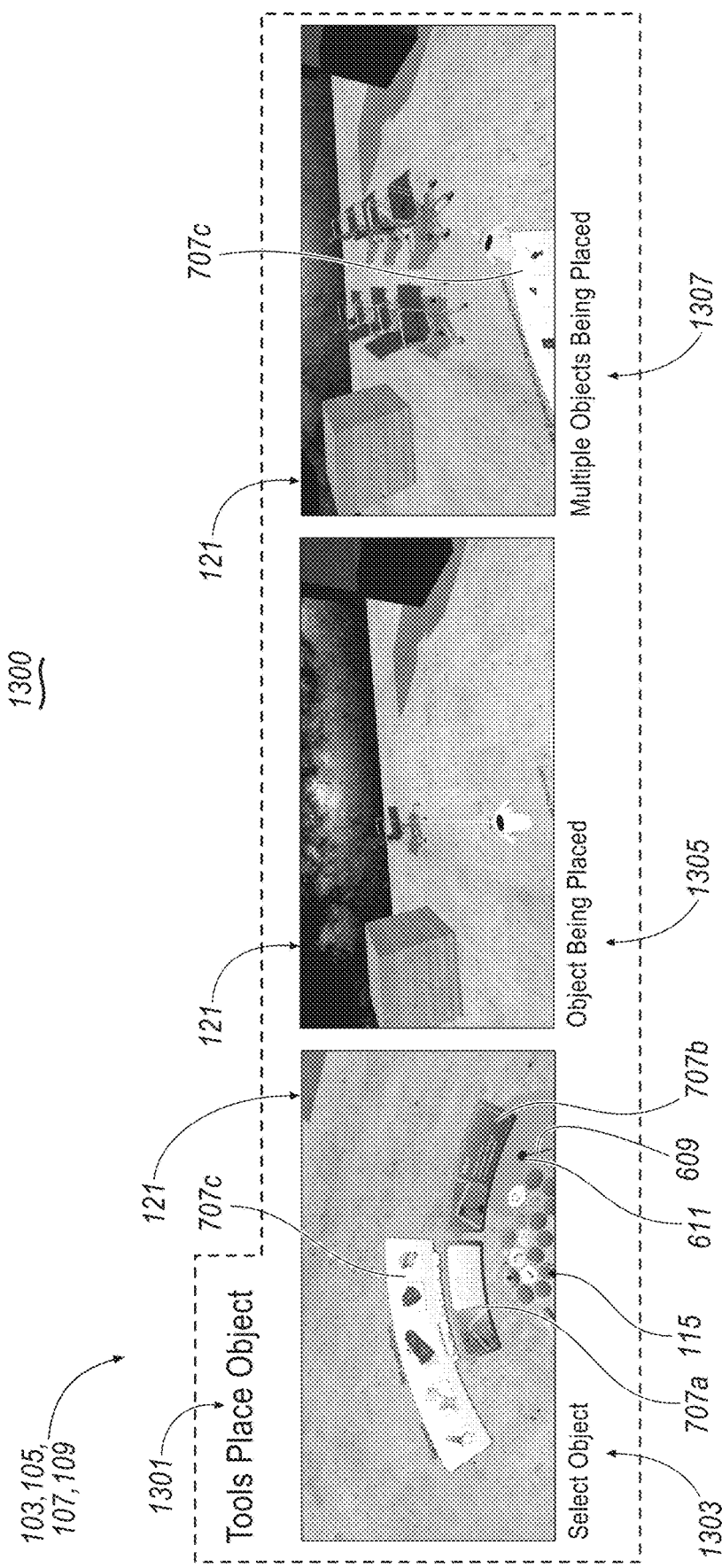
FIG. 14 illustrates an exemplary place object process of the present disclosure.

FIG. 14 illustrates an exemplary process 1300 of program 109 including, for example, VR tools place object 1301 with operations provided by way of one or more processor 103, memory 105, user interface 107 and environment 121. This process may take many different forms and include multiple and/or alternate steps, components, and arrangements. While an exemplary process is shown, the exemplary steps are not intended to be limiting, and additional or alternative steps, components and/or implementations may be used. For example, processor 103 may execute program 109 to generate one or a plurality of operations, user interfaces and modeling information for display by way of user interface 107 including toolbelt 115 for providing select object 1303 including projection 609, selection spot 611, VIV user interfaces 707*a,b,c* to provide user inputs, outputs and corresponding operations for real-time feedback, movement, adaptation, measurement, viewing and image capture of object 125, avatar 123 and/or environment 121. This is a library of pre-loaded objects that comes with the toolbelt software. It is categorized into object types such as small seating, large seating, tables, kitchen equipment, storage, etc. The system is able to expand to accommodate objects supplied by outside vendors through plug-ins to the software.

Figure 15:
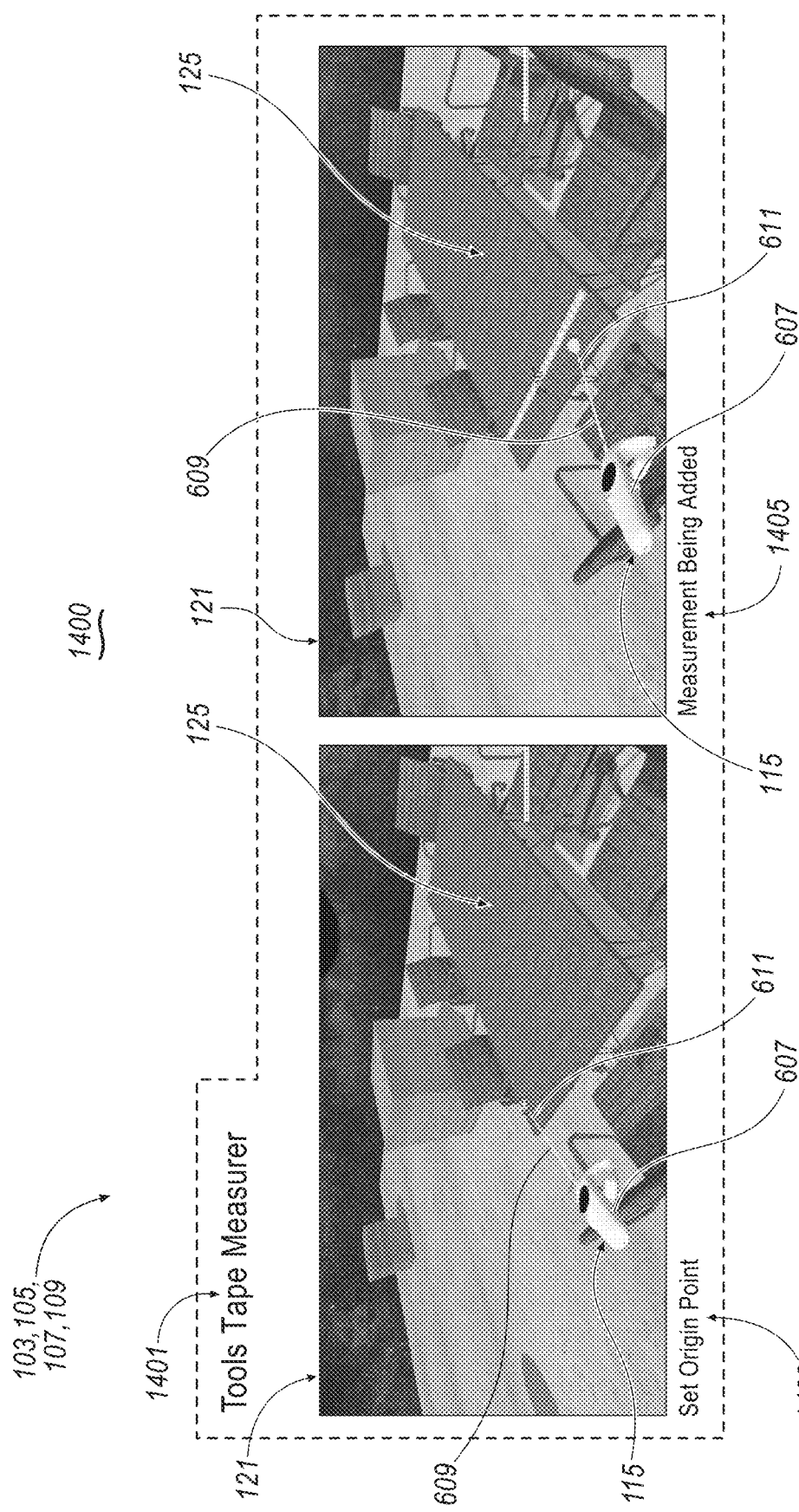
FIG. 15 illustrates an exemplary tape measurer process of the present disclosure.

FIG. 15 illustrates an exemplary process 1400 of program 109 including, for example, VR tools tape measurer 1401 with operations provided by way of one or more processor 103, memory 105, user interface 107 and environment 121. This process may take many different forms and include multiple and/or alternate steps, components, and arrangements. While an exemplary process is shown, the exemplary steps are not intended to be limiting, and additional or alternative steps, components and/or implementations may be used. For example, processor 103 may execute program 109 to generate one or a plurality of operations, user interfaces and modeling information for display by way of user interface 107 including set origin point 1403 providing toolbelt 115 with virtual selection tool 607, projection 609 and selection spot 611 to provide user inputs, outputs and corresponding operations for real-time feedback, movement, adaptation, measurement, viewing and image capture of object 125, avatar 123 and/or environment 121. In addition to playing a measurement and viewing its annotation, there are settings accessible using the VR controller's scroll buttons. These settings switch the "snap" mode of the measurer to snap to inches or feet. There is also an "orthographic" or freeform measurement option where you either draw lines on the xy, xz, or zy planes, or you draw between any two points. These settings functions are very useful for understanding architectural spaces through aligned or unaligned measurements and snapping to different scales.

Figure 16:
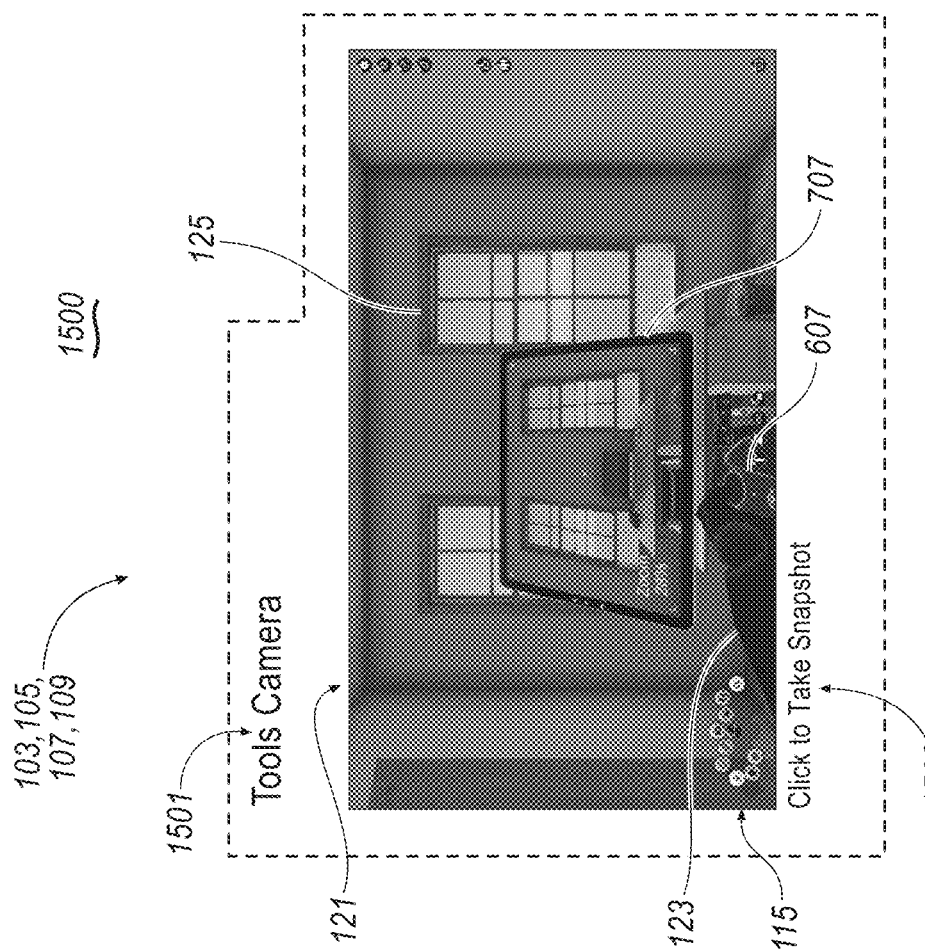
FIG. 16 illustrates an exemplary camera process of the present disclosure.

FIG. 16 illustrates an exemplary process 1500 of program 109 including, for example, VR tools camera 1501 with operations provided by way of one or more processor 103, memory 105, user interface 107 and environment 121. This process may take many different forms and include multiple and/or alternate steps, components, and arrangements. While an exemplary process is shown, the exemplary steps are not intended to be limiting, and additional or alternative steps, components and/or implementations may be used. For example, processor 103 may execute program 109 to generate one or a plurality of operations, user interfaces and modeling information for display by way of user interface 107 including click-to-take snapshot 1503 providing toolbelt 115, virtual selection tool 607 and VIV user interface 707 to provide user inputs, outputs and corresponding operations for real-time feedback, movement, adaptation, measurement, viewing and image capture of object 125, avatar 123 and/or environment 121. This snapshot tool gives a real-time preview of the image you are going to take through the 3D camera object, like a virtual camera in the user's hand with a view finder. The user can change visual settings for the 3D camera snapshot only and preview them inside the 3D camera object. Once the user hits the snapshot button, it automatically encodes the snapshot and saves it onto a predefined folder location.

Figure 17:
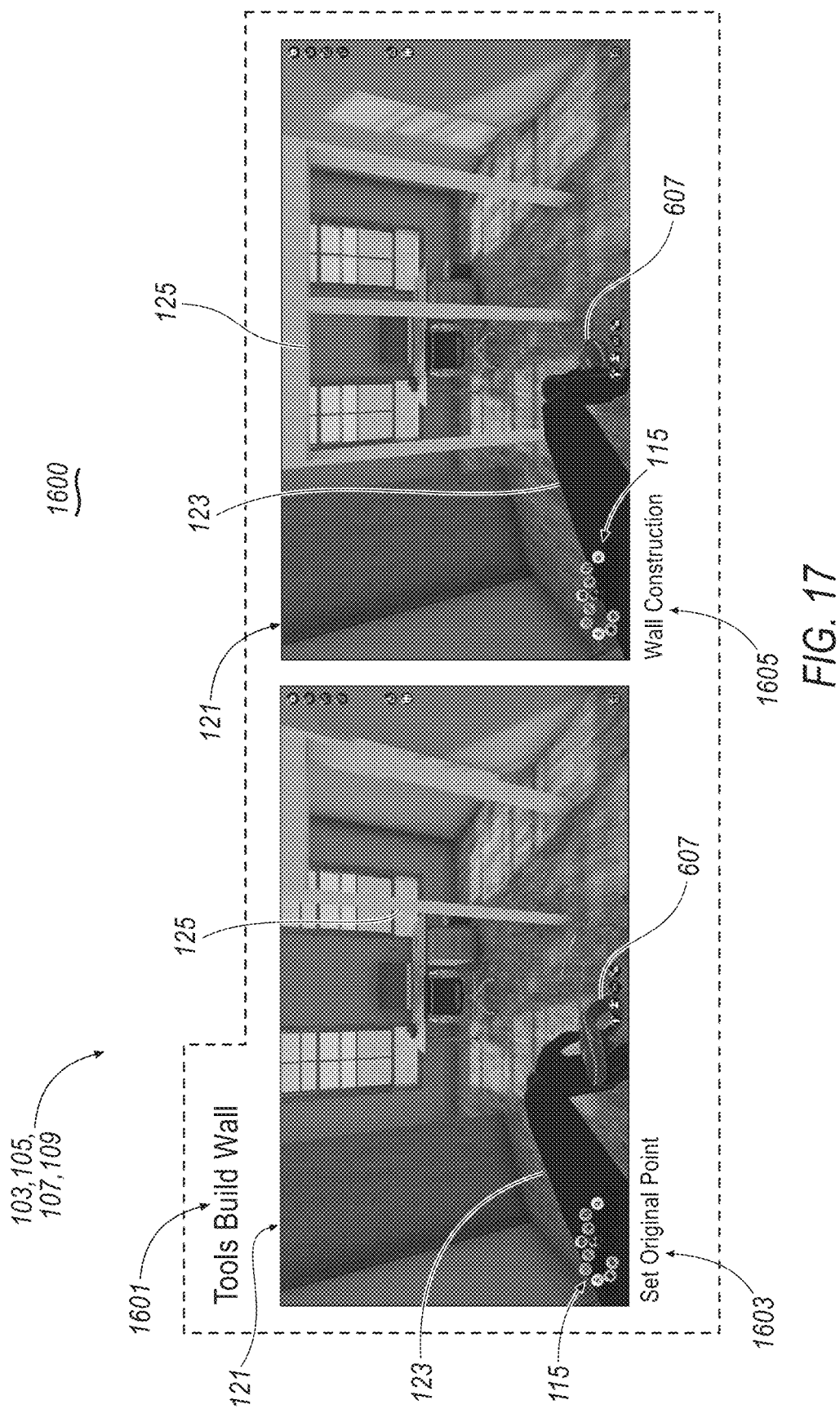
FIG. 17 illustrates an exemplary build process of the present disclosure.

FIG. 17 illustrates an exemplary process 1600 of program 109 including, for example, VR tools build wall 1601 with operations provided by way of one or more processor 103, memory 105, user interface 107 and environment 121. This process may take many different forms and include multiple and/or alternate steps, components, and arrangements. While an exemplary process is shown, the exemplary steps are not intended to be limiting, and additional or alternative steps, components and/or implementations may be used. For example, processor 103 may execute program 109 to generate one or a plurality of operations, user interfaces and modeling information for display by way of user interface 107 including set origin point 1603 for building and modifying object 125 (e.g., a wall or doorway) using toolbelt 115 with virtual selection tool 607 to provide user inputs, outputs and corresponding operations for real-time feedback, movement, adaptation, measurement, viewing and image capture of object 125, avatar 123 and/or environment 121. The build wall tool 1601 also has a library of objects broken down by category and viewable through a controller-based interface. These include for example, glass partition systems, solid walls, doorways, windows, etc. The system is able to expand to accommodate wall types supplied by outside vendors through plug-ins to the software.

FIG. 18 illustrates an exemplary process 1700 of program 109 including, for example, VR tools doodle 1701 with operations provided by way of one or more processor 103, memory 105, user interface 107 and environment 121. This process may take many different forms and include multiple and/or alternate steps, components, and arrangements. While an exemplary process is shown, the exemplary steps are not intended to be limiting, and additional or alternative steps, components and/or implementations may be used. For example, processor 103 may execute program 109 to generate one or a plurality of operations, user interfaces and modeling information for display by way of user interface 107 including doodle tool 3D mouse position 1703 and 3D drawings made with the doodle tool's 3D drawing that is made with 3D mouse position 1705. In order to create drawings, the user positions the 3D mouse position of the doodle tool 1707 in space and clicks the trigger on the controller. The user then moves the 3D mouse position 1707 to another position in space and a 3D drawing 1709 will be drawn in between the two positions. Users may use this tool to sketch out more gestural 3D notes in a space for documentation, communication, and later correction.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. An interactive design system for real-time architectural adaptation, having a user device including a hardware processor, physical memory and a user interface, and for providing operations comprising:
  generate, by the user interface, a virtual reality (VR) architectural session including a toolbelt with a virtual selection tool for movement, adaptation, measurement, and viewing and image capture of at least one of an environment, an object and an avatar;
  receive, by the user interface, a selection spot on at least one of the object, the environment, and the avatar identified by a projection extending from the virtual selection tool to the at least one of the object, the environment and the avatar;
  receive, by the user interface, a first adaptation relative to the at least one of the object, the environment and the avatar;
  display, by the user interface in real-time during the VR architectural session, the first adaptation to the at least one of the object, the environment and the avatar; and
  wherein the user interface includes a canvas controller for at least one of hiding and unhiding at least one of a plurality of model layers in the VR architectural session.

2. The system of claim 1, wherein the toolbelt includes a through person camera, a shoulder camera, a first person VR camera, and a fly-through camera.

3. The system of claim 1, the operations further comprising: receive, by the user interface, a second adaptation relative to the at least one of the object, the environment and the avatar.

4. The system of claim 1, the operations further comprising: place, by the user interface, at least one additional object in the VR architectural session;
wherein the at least one additional object includes at least one of a seat, a table, a kitchen equipment, and a storage.

5. The system of claim 3, the operations further comprising: move, by the user interface, one or more portions of the at least one of the object, the environment and the avatar according to the second adaptation.

6. The system of claim 3, the operations further comprising: build, by the user interface, at least one of a wall, a glass partition system, a doorway, and a window in the VR architectural session.

7. The system of claim 1, wherein the toolbelt includes a VR tools tape measurer; and
the VR tools tape measurer includes a snap mode that allows a user to switch between different measurement scales.

8. The system of claim 1, wherein the plurality of model layers include a floor layer, a furniture layer, and a mechanical geometry layer.

9. The system of claim 1, wherein the plurality of model layers includes a plurality of object layers that each correspond to an associated object category.

10. The system of claim 1, wherein:
a plurality of visual appearance settings of the VR architectural session are adjustable via the canvas controller; and
the plurality of visual appearance settings include sun position, bloom, and lighting intensity.

11. The system of claim 1, wherein the toolbelt includes a VR tools teleport for teleporting a VR user to a location in the environment that is identified by placing the selection spot on the location with the virtual selection tool.

12. The system of claim 11, wherein the environment includes a plurality of teleport regions including:
at least one unlocked teleport region onto which the VR user is permitted to teleport via the VR tools teleport; and
at least one locked teleport region onto which the VR user is not permitted to teleport via the VR tools teleport.

13. The system of claim 12, wherein:
the at least one unlocked teleport region includes a portion of the environment tagged as at least one of a floor and a stair; and
the at least one locked teleport region includes a portion of the environment tagged as a wall.

14. The system of claim 1, further comprising an observer component and an administrator component, wherein:
the observer component includes the toolbelt;
the administrator component includes a plurality of administrator inputs; and
the plurality of administrator inputs includes at least one override command for overriding at least one feature of the observer component.

15. The system of claim 14, wherein the at least one override command includes a virtual reality tool override for changing a tool of the toolbelt currently being utilized by the observer component to a different tool of the toolbelt.

16. The system of claim 14, wherein the plurality of administrator inputs further includes an accessible tool selection input for limiting which tools of the toolbelt are accessible to the observer component.

17. A user interface device of an interactive design tool for real-time architectural adaptation with operations comprising:
generate a virtual reality (VR) architectural session including a toolbelt with a virtual selection tool for movement, adaptation, and measurement of at least one of an environment, an object and an avatar;
receive a selection spot on at least one of the object, the environment and the avatar by extending a projection from the virtual selection tool to the at least one of the object, the environment and the avatar;
receive a first adaptation relative to the at least one of the object, the environment and the avatar, the first adaptation including a user's custom material finish for the at least one of the object, the environment and the avatar, the user's custom material finish created from at least one user uploaded image; and
display, in real-time during the VR architectural session, the first adaptation to the at least one of the object, the environment and the avatar.

18. The device of claim 17, wherein the toolbelt includes a second virtual selection tool.

19. The device of claim 17, the operations further comprising:
receive a second adaptation relative to the at least one of the object, the environment and the avatar;
receive a third adaptation relative to the at least one of the object, the environment and the avatar; and
at least one of:
change one or more portions of the at least one of the object, the environment and the avatar according to one or more of the first, second and third adaptations;
move one or more portions of the at least one of the object, the environment and the avatar according to one or more of the first, second and third adaptations;
build one or more new portions of the at least one of the object, the environment and the avatar according to one or more of the first, second and third adaptations; and
automatically generate one or more new portions of the at least one of the object, the environment and the avatar in response to one or more of the first, second and third adaptations.

20. A method of an interactive design tool for real-time architectural adaptation, the method comprising:
generating a virtual reality (VR) architectural session including a toolbelt with a virtual selection tool for movement, adaptation, and viewing and image capture of at least one of an environment, an object and an avatar;
selecting a selection spot on the object by extending a projection between the virtual selection tool and the object;
selecting a first adaptation relative to at least one of the object, the environment and the avatar;
displaying, in real-time during the VR architectural session, the first adaptation to the at least one of the object, the environment and the avatar; and
at least one of hiding and unhiding at least one of a plurality of model layers in the VR architectural session to change which categories of architectural elements are displayed.

* * * * *